United States Patent [19]

Holtsmark

[11] Patent Number: 5,143,408
[45] Date of Patent: Sep. 1, 1992

[54] VARIABLE SIZE PIPE CONNECTOR

[76] Inventor: Eric B. Holtsmark, 321 Scenic Ave., Piedmont, Calif. 94611

[21] Appl. No.: 789,882

[22] Filed: Nov. 22, 1991

[51] Int. Cl.⁵ ............................................. F16L 35/00
[52] U.S. Cl. ................................... 285/93; 285/177; 285/236
[58] Field of Search ................ 285/93, 3, 4, 177, 236, 285/235

[56] References Cited

U.S. PATENT DOCUMENTS

| | | | |
|---|---|---|---|
| 1,258,884 | 3/1918 | Fife | 285/4 |
| 1,722,676 | 7/1929 | Parker | 285/177 |
| 2,419,453 | 4/1947 | Kocevar | 285/177 |
| 2,449,265 | 9/1948 | Williams | 285/93 X |
| 3,169,562 | 2/1965 | Goyd | 285/177 X |
| 3,759,445 | 9/1973 | King | 285/236 X |
| 3,887,221 | 6/1975 | Young | 285/236 |
| 3,995,888 | 12/1976 | McIlroy | 285/93 X |
| 4,563,847 | 1/1986 | Hasty | 285/4 X |
| 4,763,695 | 8/1988 | Dovey | 285/236 X |
| 5,036,636 | 8/1991 | Hosty | 285/4 X |

FOREIGN PATENT DOCUMENTS 586299  12/1977  U.S.S.R. ............... 285/177

*Primary Examiner*—Dave W. Arola
*Attorney, Agent, or Firm*—Richard C. Litman

[57] ABSTRACT

Shown and described is a variable size pipe connector which may be cut into one or more segments and is used to connect together pipes having different inside diameters. A pair of hose clamps is used to secure the connector in place and assure a fluid tight seal. The connector may have external indicia indicating cut lines directly dimensionally related to the diameters of pipes to be connected together. PVC and similar thick walled pipe ends may be grooved to further assure integrity of the seal between connector and pipes when clamped thereabout by hose clamps and metal pipe ends may be flared for the same purpose.

11 Claims, 2 Drawing Sheets

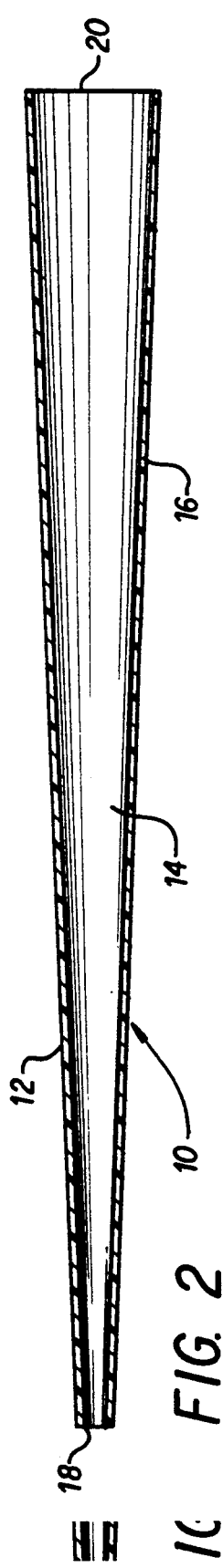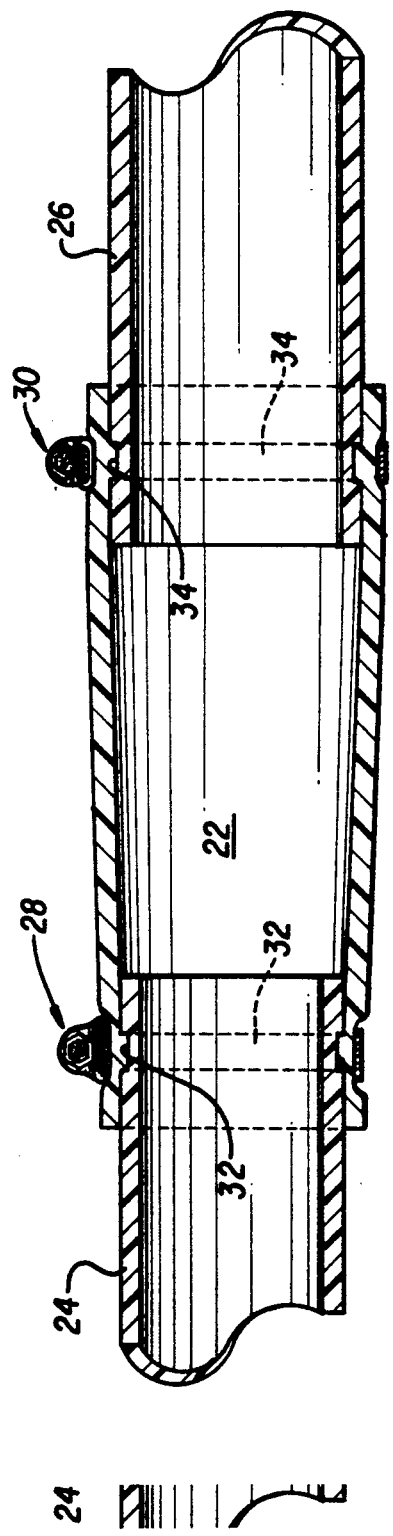

VARIABLE SIZE PIPE CONNECTOR

FIELD OF THE INVENTION

The present invention relates to pipe connectors and, more particularly, to a connector for pipes of varying diameter.

DESCRIPTION OF THE PRIOR ART

Attempts have been made to manufacture connectors to join together pipe ends having different diameters. For example, U.S. Pat. No. 4,763,695 issued Aug. 16, 1988 to Richard L. Dooley shows a connector but with a reinforced, step down intermediate zone and sets of raised ridges for retaining hose clamps in place, a minor area of the band portion of each hose clamp being directly bonded to the connector. Tapered tubular or frustoconical structures per se are known in other art areas; U.S. Pat. No. 2,400,031 issued May 7, 1946 to Robert Stewart et al teaches the manufacture of a tubular fire extinguisher horn, for example. Hose clamps for automobile cooling systems are well known, an example of an improved hose clamp being disclosed in U.S. Pat. No. 4,530,524 issued Jul. 23, 1985 to Donald L. Stephens.

However, the prior art fails to teach or suggest a variable size pipe connector of pliable but generally stiff material, being frustoconically shaped and easily cut into one or more predetermined, indicated lengths for attaching together two pipes or two pipe ends of varying diameter.

Thus, none of the above inventions and patents, taken either singly or in combination, is seen to teach or suggest the instant invention as disclosed and claimed.

SUMMARY OF THE INVENTION

Accordingly, a primary object of the present invention is to provide a variable size pipe connector of frustoconical, tubular configuration which may be cut into one or more segments for attaching together pipe ends having different inside diameters.

It is another object of the invention to provide a variable size pipe connector of frustoconical, tubular configuration made of a pliable, deformable material.

It is a further object of the invention to provide a frustoconical, variable size pipe connector which may be cut into segments for connecting together pipes having different diameters, the pipe ends to be connected together being externally grooved or having their open ends flared so as to assure a fluid tight seal between the connector segment and the pipe ends being connected; the seal may be further assured by clamping the segment connector ends about the pipe ends by hose clamps or the like.

It is yet another object of the invention to provide a variable size pipe connector in the form of an elongated, frustoconical tube, the outside of the connector having circumferential indicia lines directly dimensionally related to the inside diameters of pipes to be connected together, so that a segment may be cut from the connector having open ends matching the corresponding open ends of the pipe ends being connected.

These and other objects of the present invention will become readily apparent upon further review of the following specification and drawings.

BRIEF DESCRIPTION OF THE DRAWINGS

FIG. 1 is a side elevational view of the variable size pipe connector of this invention;

FIG. 2 is a sectional view of the invention as shown in FIG. 1;

FIG. 3 is a sectional, enlarged scale view of a variable size pipe connector segment connecting together two plastic material or PVC pipes having different diameters according to the invention;

Similar reference characters denote corresponding features consistently throughout the attached drawings.

DETAILED DESCRIPTION OF THE PREFERRED EMBODIMENTS

Figure 4:
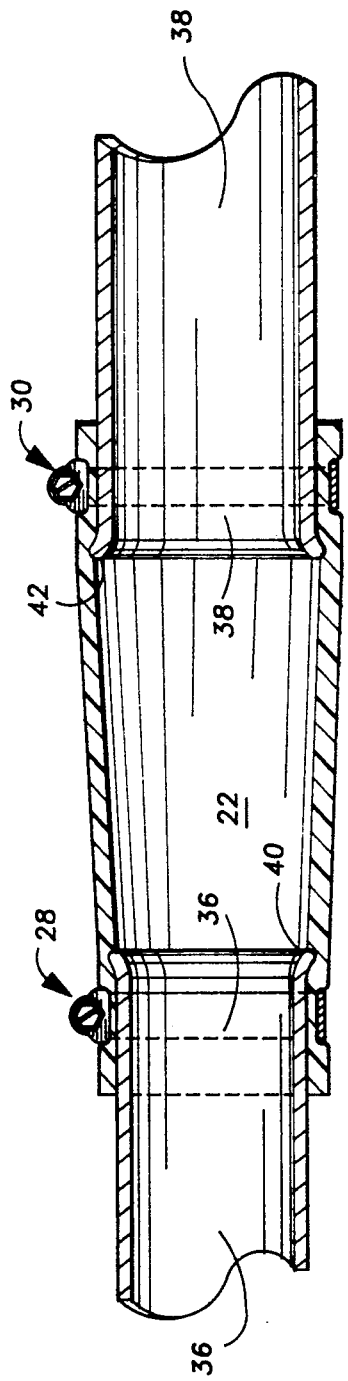
FIG. 4 is a sectional view similar to FIG. 4 but showing two metal pipe ends connected together.

The present invention as illustrated in FIGS. 1 and 2 includes a connector 10 in the form of an elongate, frustoconical coupling tube having an exterior surface 12 and a generally concentric interior surface 14. Connector 10 is of generally uniform configuration from end to end as shown, the surfaces 12 and 14 defining a wall 16 therebetween. The connector 10 terminates in a relatively smaller diameter end 18 and a relatively larger diameter end 20.

The material making up the connector 10 may be fabricated from any one of a wide variety of known materials, so long as the connector 10 is sufficiently flexible and strong to tolerate the stresses of clamping and fluid pressure, in a manner to be described below, and bending, as in the case of connecting together two pipe ends of varying diameter that may not be axially aligned. The method of fabricating connector 10 may also be selected from a wide variety of known processes, such as casting, spinning, extruding/stretching and weaving, to name a few. In any event, an ideal material would be a reinforced rubberized material such as used in automobile heating system hoses.

Referring now to FIG. 3, a frustoconical coupling tube segment 22 is shown, connecting together the open ends of pipes 24 and 26 which have different inside diameters, as is clearly apparent from the figure. (Segment 22 is cut from the connector 10 in a manner to be described below.) In this example, pipes 24, 26 are made of plastic or PVC material, as is illustrated, and are axially aligned, only for purposes of clarity of the figure. More often than not, pipes 24, 26 may not be axially aligned and/or may be angularly related to one another. The segment 22 is attached to pipes 24, 26, by a pair of otherwise conventional hose clamps 28, 30; the hose clamps 28, 30 may be of the type commonly used in automobile heating systems.

With further reference to FIG. 3, the exterior ends of pipes 24, 26 may be circumferentially grooved as at 32, 34, so that when clamping pressure is applied to the segment 22 ends over the grooves 32, 34 by installation of the hose clamps 28, 30, a portion of the material on the inside of the segment 22 ends is forced into the respective grooves 32, 24. This assures an even tighter fluid seal between the coupling segment 22 and the pipes 24, 26. As stated above, the material making up the connector 10 and thus the segment 22 is sufficiently pliable so as to be forced into interengagement within the grooves 32, 34.

With reference to FIG. 4, the same frustoconical segment 22 is illustrated, joining together two metal pipes 36, 38, of different diameter. Similar hose clamps 28, 30 are employed to install the connecting segment 22 in place. Additionally, the terminal ends of pipes 36, 38 may be flared slightly as is indicated at 40, 42. As the hose clamps 28, 30 are tightened, the respective flared pipe ends 36, 38 will bite into the material on the interior of segment 22, thus to further insure integrity of the fluid tight seal of the coupling segment 22 with these metal pipes. Again, and as in the case of the FIG. 3 illustration, the two pipe ends 36, 38 are shown aligned but, of course, they may not be so aligned and might be angularly related to one another.

Dissimilar material pipes of different inside diameter might be joined together by the connector of this invention. For example, a metal pipe 36 or 38 could be connected to a PVC pipe 26 or 24, without any need of changing the structure of the connecting segment 22 or the hose clamps 28, 30.

Figure 5:
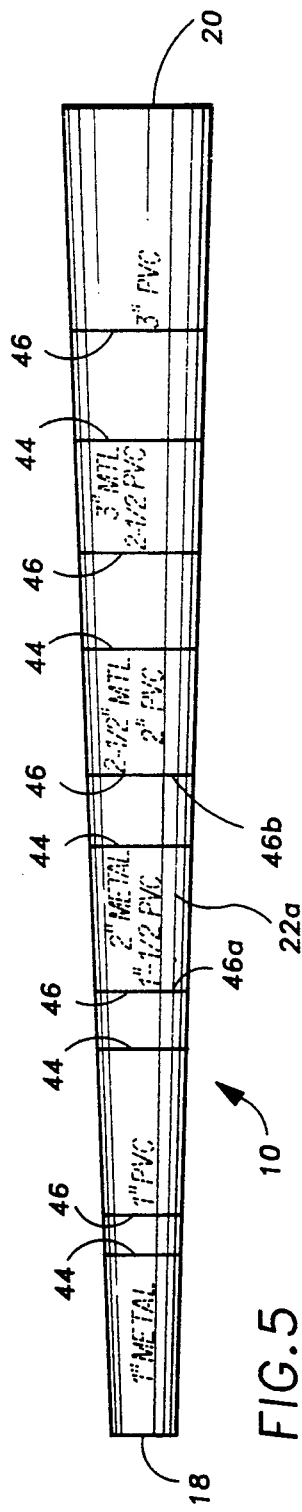
FIG. 5 is a side elevational view of the invention similar to FIG. 1 but further illustrating a connector having indicia arrayed therealong indicating cut lines for producing a connector segment of the type shown in FIGS. 3 and 4, the indicia lines being directly, dimensionally related to the internal diameters of pipes to be connected.

The connector 10 may have indicia markings arrayed along its exterior as is illustrated in FIG. 5. Such indicia lines can be directly dimensionally related to the inside diameter of, for example, PVC pipes as shown at 44 and to the inside diameter of metal pipes, for example, at 46. It is standard practice in the art to refer to pipes by their internal diameters, not their external diameters. Thus, segment 22 end fitting a predetermined inside diameter of PVC pipe would, desirably, be larger than an end neatly fitting the exact same inside diameter of metal pipe. By way of example only, FIG. 5 shows pairs of indicia lines 44,46; 44,46; . . . 44,46 for indicating just where to cut a segment 22 from connector 10 depending on whether the pipe to which a segment end is to be connected is plastic or metal. FIG. 5 shows such pairs of indicia lines for 1", 1 ½", 2", 2 ½" and 3" metal and plastic pipe. Of course, the indicia lines might be graduated in ¼" increments and metric measurements could be indicated if desired.

Figure 6:
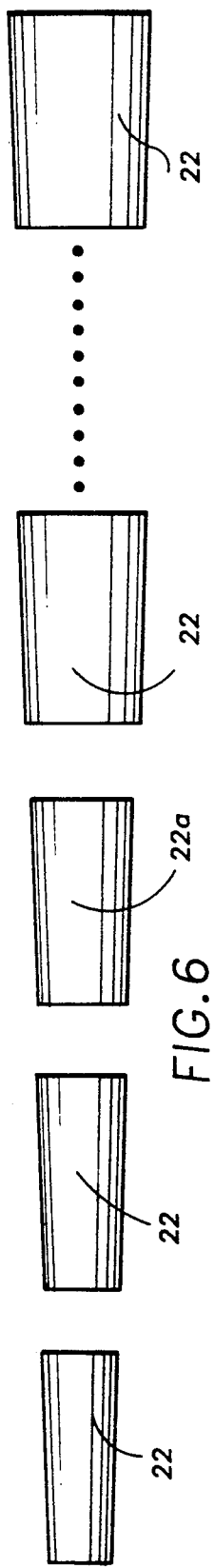
FIG. 6 is a view similar to FIG. 5 but showing the connector of the invention cut into pipe connector segments.

With reference to FIG. 6, segments are shown cut from connector 10. By way of example, a 2" PVC pipe is to be connected to a 1 ½" PVC pipe. The user would cut a segment 22a from connector 10 by cutting along the circumferential lines 46a, 46b as illustrated in FIG. 5 which results in a segment 22a as shown most clearly in FIG. 6. The end segments shown in FIGS. 5 and 6 can be used; in the embodiment shown in these figures, end 18 of connector 10 could be used for ½" PVC pipe and end 20 could be used for 3 ½" pipe. Additionally, a longer segment 22 might be cut from connector 10 to connect together, for example, a 1" metal pipe to a 2" PVC pipe.

The thickness of wall 16 of connector 10 is a function of length and diameter dictated by anticipated pressures internally of the pipe connection as well as by stresses expected from clamping and/or bending of the connection. Also, the length of connector 10 is a function of sufficient length to accommodate a predetermined range of pipe sizes but with a sufficiently small angle of taper to assure that proper seals will be made by the connection. By way of example, a connector 10 could be made 36" long with an approximately 2.5 degree angle between the axis of connector 10 and the outside surface 12. The end 18 would have an inside diameter of about 9/16" and the end 20 would have an inside diameter of about 3 ⅜". Such a connector 10 can be used to connect together pipes of from ½" to 3 ½" inside diameter, whether metal or plastic. Other lengths and diameters of connector 10 readily suggest themselves to those skilled in the art. Also, the angle of taper of the frustoconical connector 10 can be increased to produce shorter length connector segments than those described above and illustrated in the drawings. Furthermore, the material from which the connector 10 is fabricated may be sufficiently pliable so as to spread slightly when forced over a pipe end slightly larger than a segment end or, conversely, may bunch together somewhat when placed about a pipe end slightly smaller than a segment end and secured in place by a hose clamp; in either case, a fluid tight seal is assured.

The invention is useful in a wide variety of environments, from radiator heating systems to industrial or residential plumbing installations, by way of example only. Obviously, the connector of this invention may be used in liquid or gas installations as well.

It is to be understood that the present invention is not limited to the embodiments described above, but encompasses any and all embodiments within the scope of the following claims.

I claim:

1. A fluid tight, variable size pipe connector for securing together two pipe ends having different inside diameters, said connector comprising:
   an elongate, tapered coupling tube of generally uniform, end to end configuration, having a frustoconical exterior surface and being made of a pliable material;
   means defining a frustoconical interior surface within said tube, generally concentric with respect to said exterior surface;
   a tube wall defined by said interior and exterior surfaces and having a generally uniform thickness throughout the length of said tube;
   said coupling tube terminating in a first, narrow inside diameter end and a second, wide inside diameter end; and
   indicia means arrayed along said coupling tube exterior surface, defining cut lines for slicing a frustoconical coupling tube segment from said connector, said segment thus having open pipe connecting ends, said indicia means being directly, dimensionally related to the diameters of pipe ends to be connected together.

2. The invention as claimed in claim 1 wherein said coupling tube is pliable, deformable material which is readily deformable upon the application of externally applied clamping pressure, thus to assure a fluid tight seal between a coupling tube segment and the pipe ends to which it is connected.

3. The invention as claimed in claim 1, further comprising a pair of clamping means for encircling and clamping said segment open pipe connecting ends in fluid tight relationship with pipe ends being connected together by said segment.

4. The invention as claimed in claim 3, further comprising means defining a pair of circumferential grooves on the exterior of the pipe ends being connected together, whereby upon installation of said clamping means onto said coupling tube segment ends and the pipe ends being connected together, portions of the coupling tube segment ends are forced into the grooves, thus to further assure a fluid tight seal between said segment and the pipe ends being connected together.

5. The invention as claimed in claim 3, further comprising means defining flared open ends in the pipe ends being connected together, whereby upon installation of said clamping means onto said coupling tube segment ends and the pipe ends being connected together, portions of the coupling tube segment ends are deformed by said flared open ends, thus to further assure a fluid tight seal between said segment and the pipe ends being connected together.

6. The invention as claimed in claim 1 wherein said indicia means comprise a plurality of visually perceived lines circumferentially about said coupling tube, each said line being directly, dimensionally related to the inside diameter of a pipe to be inserted into a resultant segment end sliced from the coupling tube at that line.

7. The invention as claimed in claim 6 wherein said indicia means further comprise a second plurality of visually perceived second line circumferentially about said coupling tube, each said second line being directly, dimensionally related to the inside diameter of a pipe to be inserted into a resultant segment end sliced from the coupling tube at that second line, pairs of said lines and said second lines being related to pipes to be connected together having the same inside diameters and different outside diameters.

8. The invention as claimed in claim 2 wherein said indicia means comprise a plurality of visually perceived lines circumferentially about said coupling tube, each said line being directly, dimensionally related to the inside diameter of a pipe to be inserted into a resultant segment end sliced from the coupling tube at that line.

9. The invention as claimed in claim 8 wherein said indicia means further comprise a second plurality of visually perceived second lines circumferentially about said coupling tube, each said second line being directly, dimensionally related to the inside diameter of a pipe to be inserted into a resultant segment end sliced from the coupling tube at that second line, pairs of said lines and said second lines being related to pipes to be connected together having the same inside diameters and different outside diameters.

10. The invention as claimed in claim 3 wherein said indicia means comprise a plurality of visually perceived lines circumferentially about siad coupling tube, each said line being directly, dimensionally related to the inside diameter of a pipe to be inserted into a resultant segment end sliced from the coupling tube at that line.

11. The invention as claimed in claim 10 wherein said indicia means further comprise a second plurality of visually perceived second lines circumferentially about said coupling tube, each said second line being directly, dimensionally related to the inside diameter of a pipe to be inserted into a resultant segment end sliced from the coupling tube at that second line, pairs of said lines and said second lines being related to pipes to be connected together having the same inside diameters and different outside diameters.

* * * * *